United States Patent [19]
Speakman

[11] Patent Number: 6,164,850
[45] Date of Patent: Dec. 26, 2000

[54] 3D PRINTING AND FORMING OF STRUCTURES

[76] Inventor: Stuart Speakman, 7 Chapel Drive, Little Waltham, Chelmsford, Essex CM3 3LW, United Kingdom

[21] Appl. No.: 09/194,850
[22] PCT Filed: Jun. 4, 1997
[86] PCT No.: PCT/GB97/01509
§ 371 Date: Jun. 28, 1999
§ 102(e) Date: Jun. 28, 1999
[87] PCT Pub. No.: WO97/48557
PCT Pub. Date: Dec. 24, 1997

[30] Foreign Application Priority Data

Jun. 4, 1996 [GB] United Kingdom ............... 9611582

[51] Int. Cl.[7] ........................................... B41J 2/25
[52] U.S. Cl. ................. 400/120.09; 347/107; 101/483; 101/490
[58] Field of Search ............ 400/109.1, 120.09, 400/106; 101/483, 490, 129; 156/275.5, 356; 347/1, 115, 107; 430/18; 522/35

[56] References Cited

U.S. PATENT DOCUMENTS

| | | |
|---|---|---|
| 4,104,645 | 8/1978 | Fischbeck . |
| 4,291,316 | 9/1981 | Kakeno et al. . |
| 4,523,199 | 6/1985 | Ott . |
| 5,059,266 | 10/1991 | Yamane et al. . |
| 5,149,548 | 9/1992 | Yamane et al. . |
| 5,182,571 | 1/1993 | Creagh et al. . |
| 5,369,261 | 11/1994 | Shamir ........................ 235/469 |
| 5,376,503 | 12/1994 | Audett et al. ................. 430/18 |
| 5,424,822 | 6/1995 | Daniels ......................... 347/115 |
| 5,459,174 | 10/1995 | Merrill et al. ................ 522/35 |
| 5,512,122 | 4/1996 | Sokyrka ........................ 156/275.5 |
| 5,609,919 | 3/1997 | Yuan et al. ................... 347/115 |
| 5,627,578 | 5/1997 | Weintraub ..................... 400/109.1 |
| 5,649,480 | 7/1997 | Yim ............................... 101/129 |

FOREIGN PATENT DOCUMENTS

| | | |
|---|---|---|
| 2116875 | 2/1995 | Canada . |
| 2717420 | 9/1995 | France . |
| 3126372 A1 | 9/1982 | Germany . |
| 3-057625 | 3/1991 | Japan . |
| 4-099646 | 3/1992 | Japan . |
| WO95/05943 | 3/1995 | WIPO . |
| WO 97/48557 | 12/1997 | WIPO . |

OTHER PUBLICATIONS

IBM Tech Disclosure Bulletin, Braille Printed Dot Configuration, Aug. 1977, p 1204.

*Primary Examiner*—Eugene Eickholt
*Attorney, Agent, or Firm*—Wolf, Greenfield & Sacks, P.C.

[57] ABSTRACT

A method of forming a three-dimensional feature on a surface using the technique of drop ejection to deposit droplets of deposition material. The method comprises depositing a plurality of droplets on the surface to form a feature comprising multiple discrete portions, adjoining portions being formed from different deposition material. Examples of such a feature include a Braille character and a multi-layer optical device.

49 Claims, 15 Drawing Sheets

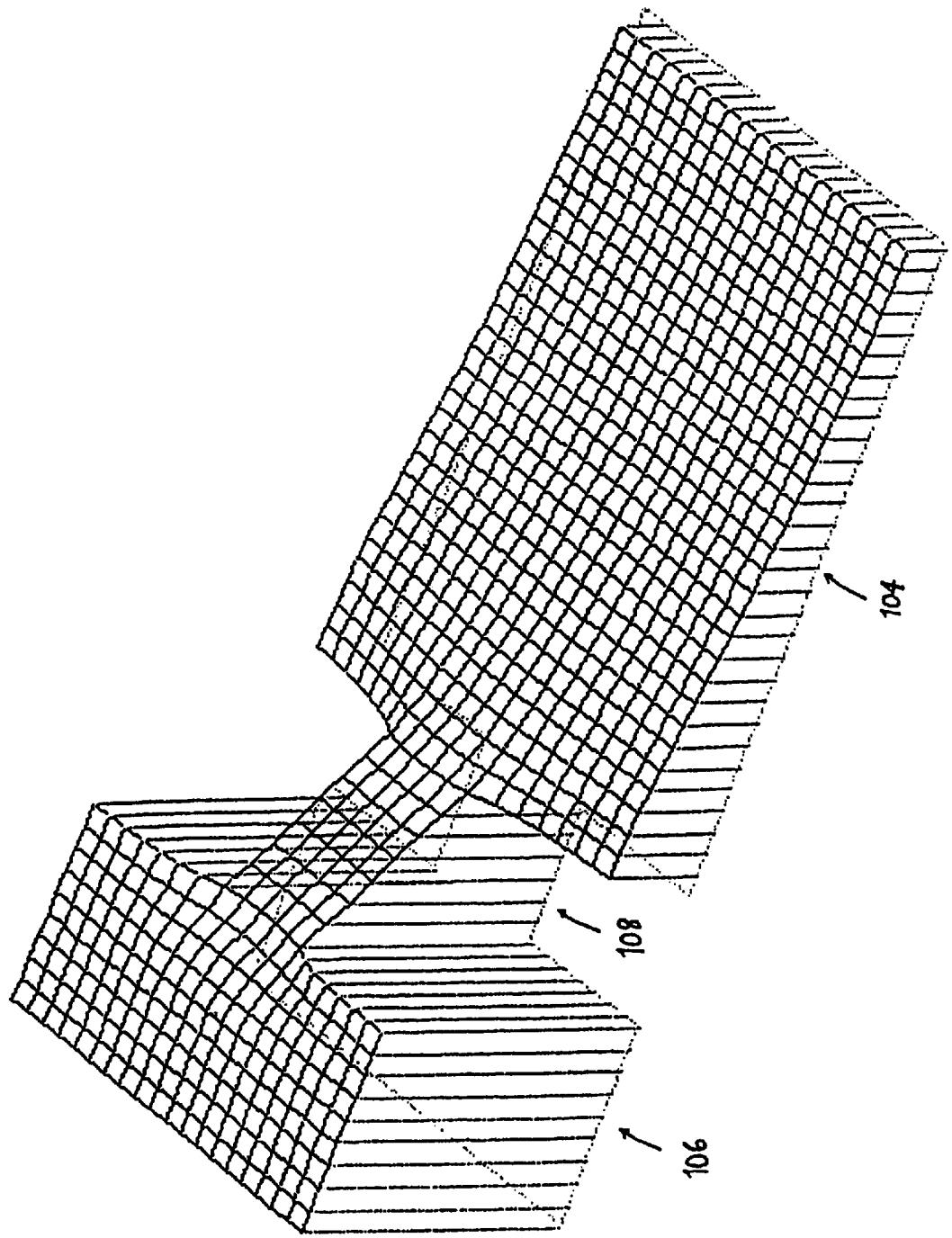

Figure 10A
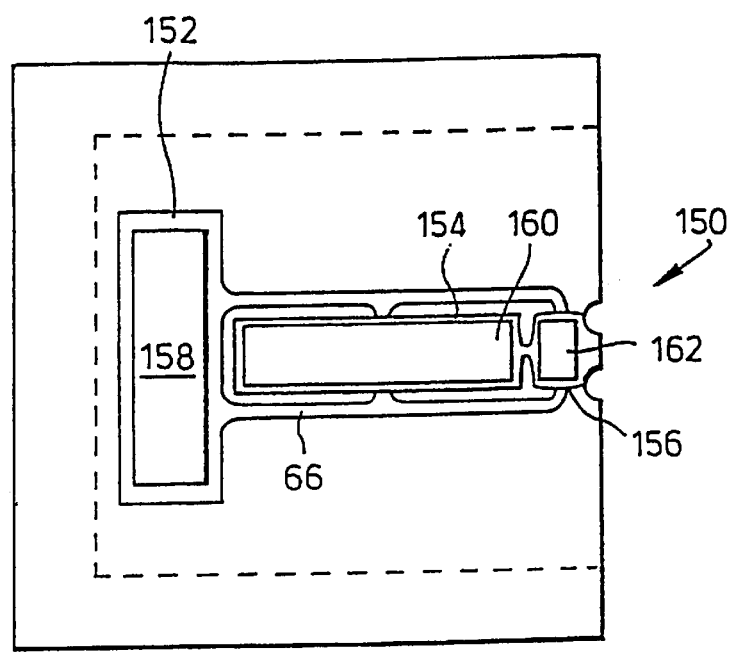
Figure 10C
Figure 10B
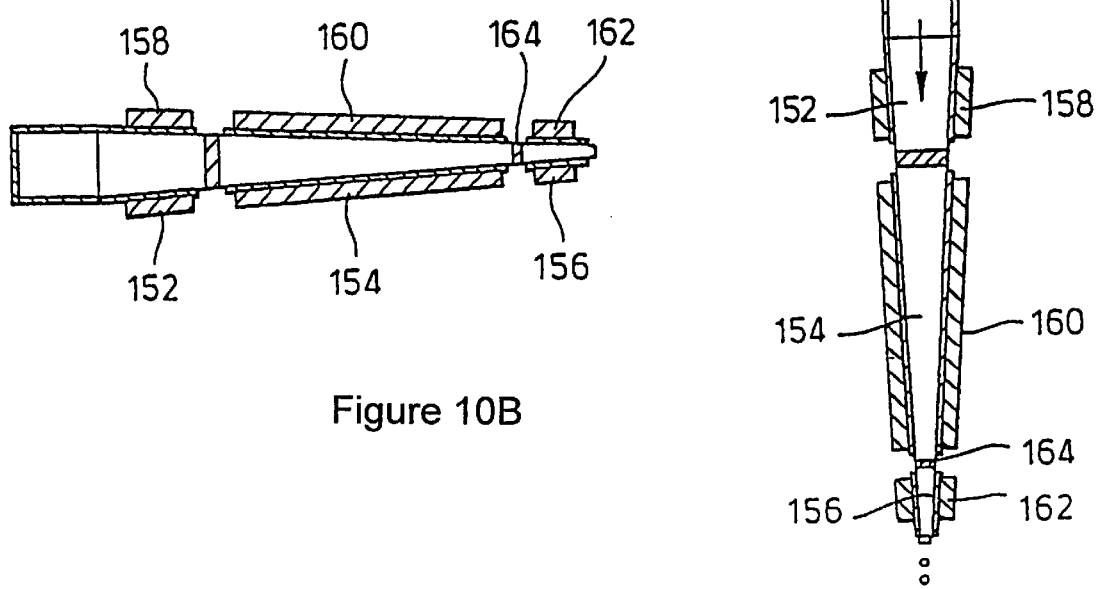

Figure 14A
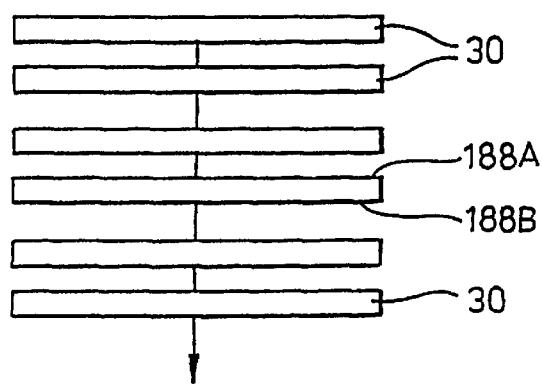
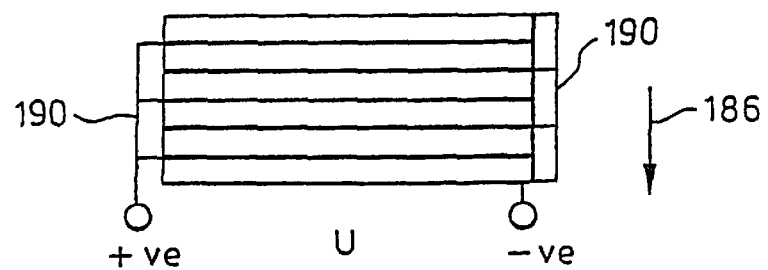
Figure 14B
Figure 14C
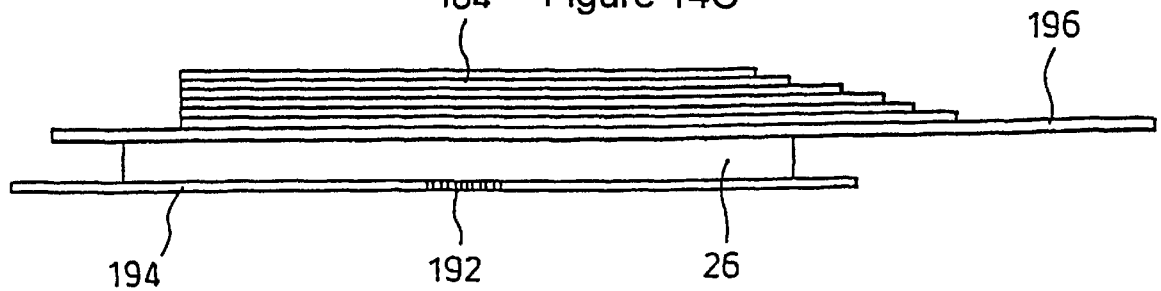

3D PRINTING AND FORMING OF STRUCTURES

The present invention relates to 3D printing and to a method and apparatus for the forming of 3D structures onto surfaces.

The present invention addresses the problem of accurate and fast formation of 3D features onto a surface. This problem is a concern in a wide range of areas, a number of which are described below.

In one example, people who use Braille for communication are particularly affected by a shortage of accurate and fast means for producing the Braille characters. One known method is to use impact printers to emboss paper with raised portions representing the Braille characters. Compared with conventional printers, however, the impact printers can be expensive due their complexity, noisy due to the constant impacting of the printer head and unreliable due to the high forces on the moving parts.

Drop-on-demand printing is a known printing technique whereby a droplet of ink is ejected from an inkjet printer head. The droplet impacts with a printing surface, dries and forms a spot which forms a recognisable pattern such as type. This technique has proved to be an efficient and economical way of printing using ink and its use is now widespread.

According to one aspect of the present invention there is provided a method of forming a three dimensional feature on a surface using the technique of drop ejection to deposit droplets of deposition material, said method comprising depositing a plurality of droplets on said surface to form a feature comprising multiple discrete portions, at least two adjoining portions being formed from different deposition material.

Preferably the plurality of droplets comprise at least one droplet of one material and at least one droplet of another material.

The application of the invention is wide. For instance, tactile character sets for the sightless such as Braille, Dotsplus, ASTeR, Moon print and such like may be formed as easily as conventional character sets. Accordingly, in a second aspect, the present invention provides a method of forming a Braille character on a surface using the technique of drop ejection to deposit droplets of deposition material, said method comprising depositing a plurality of droplets on said surface to form a character comprising multiple discrete portions, at least two adjoining portions being formed from different deposition material.

Conventional printing tasks may be performed using the present invention including, for example, warning symbols, product advertising, 'Thermographic' printing or wall paper printing. Tactile digital photography is possible for the production, say, of relief maps. The photograph is constructed from digital data including the height of the ground stored as discrete steps which defines the size or number of drops of print material applied. Upon ejecting or curing of the deposition material the individual drops combine with neighbouring drops so that the height varies continuously and not in discrete steps. Different deposition materials may be dropped onto the surface to give different textures.

Another application is textile patterning where, for instance, names or emblems can be printed directly on to teeshirts or sweatshirts. Alternatively a roll of fabric or carpet can be printed with a recurring pattern.

Another application is in coating of whole areas whereby the thickness of a laminate may be controlled. Particular use may be found in PCB production, adhesives, transparent electrodes (e.g. using co-polyaniline based solutions), optical elements (e.g. the anti-reflective coating of ophthalmic lenses) and protection of display windows. Alternatively the coating may be on a selected area only. For instance the direct writing of masks on PCBs, selective adhesives and discrete transparent electrodes.

The nozzles may be adapted to spray the deposition material, the deposition area being dictated by the number of nozzles that are fired. High precision coatings are possible using this method of ejecting a blanket area of material.

An important application of the invention is in the formation of surface structures such as waveguides for microwaves and light. In the latter case a ferroelectric optic waveguide may be built with drops of a ferroelectric material which may be thermally annealed to crystallise and set the ferroelectric properties. In a third aspect, the present invention provides a method of forming a multi-layer optical device on a surface using the technique of drop ejection to deposit droplets of deposition material, said method comprising depositing a plurality of droplets on said surface to form a device comprising multiple discrete portions.

Thin film techniques such as amorphous silicon deposition, LCD display fabrication, gas sensor fabrication and microlens formation are all possible applications of the invention. Formation of non-linear optical devices and polymer transistor structures are also possible applications.

Preferably, the deposition materials comprise between 20% and 60% solid material. Advantageously the deposition material comprises between 30% and 50% solid material and more advantageously the deposition material comprises substantially 40% solid material.

Using such a method a specific feature can be deposited with a selectable profile which is not solely determined by the deposited material (e.g. rheology, surface wetting, thixotropy). The method allows application of a multiplicity of drops, co-incident upon one point in order to build up the required feature.

Preferably the deposition material has a dynamic viscosity in the range 1 cps and 1000 cps and more preferably between 1 cps and 200 cps.

Advantageously the method further comprises the step of subjecting the deposition material to radiation treatment before, during or after deposition. The print surface may be subjected to radiation to prepare it for the deposition material. Employing in-situ UV and infrared radiation exposure provides considerable scope for modifying the reaction of the drop in order to achieve the required feature and profile.

Preferably the radiation is ultraviolet light. In this case the deposition material suitably comprises oligomers such as epoxy acrylics or urethane acrylics and more suitably said epoxy acrylics are silicone loaded. The silicon loading decreases the surface energy of the print material and renders the print material non-stick. Alternatively the deposition material suitably comprises urethane acrylics.

Preferably the radiation is infrared light. In this case the deposition materials suitably comprises water miscible partially reacted polymers.

Preferably, one of said layers comprises a printing surface treatment layer, preferably comprising epoxy acrylic.

Advantageously the method further comprises the step of raising the temperature of the deposition material prior to deposition. This decreases the dynamic viscosity of a deposition material so that it may be used in the drop-on-demand method. Such a material is a hot melt material.

Advantageously the method further comprises utilising one or coincident droplets of a cross-linkable polymeric materials and initiating the cross-linking in-flight or immediately after deposition. The initiating of the cross-linking may be by chemical means using a further coincident drop or by the radiation treatment.

In a fourth aspect, the present invention provides droplet deposition apparatus having multiple droplet deposition nozzles for the deposition of different deposition materials on a printing surface to form a three dimensional feature comprising multiple discrete portions, adjoining portions being formed from different deposition material.

The nozzles may be directed towards at a single droplet deposition site. Preferably, the nozzles deposit different deposition materials to form a feature comprising three or more portions, said portions comprising a sealant portion, a body portion and a portion formed from non-stick material.

Preferably, the droplet deposition apparatus further comprises electromagnetic means for establishing an electromagnetic field for treatment of material ejected from the nozzles. The electromagnetic means may comprise at least one waveguide or optical fibre communicating with a continuous or pulsed ultraviolet, visible light or infrared source.

The electromagnetic means may be operable at at least two discrete wavelengths.

The electromagnetic means may further comprise a focus arrangement for directing the electromagnetic radiation. Alternatively, the electromagnetic means may further comprise a scanning arrangement such as a rotating mirror.

Preferably, the apparatus comprises a deposition chamber and a shutter actuable to shield material within the chamber from an electromagnetic field.

Preferably, the apparatus further comprises a deposition chamber and actuator means in or adjacent the deposition chamber for the application of a pressure pulse to the deposition chamber, wherein the actuator means comprises a bimorph laminate including at least two layers of piezoelectric material and at least two metal layers. The actuator means may comprise at least three actuators arranged so as together to define the wall of at least part of the chamber.

Alternatively, the apparatus may further comprise a deposition chamber and actuator means in or adjacent the deposition chamber for the application of a pressure pulse to the deposition chamber, wherein the actuator means comprises at least three actuators arranged so as together to define the wall of at least part of the chamber.

The actuator means may comprise four actuators providing a rectangular cross-section for said part of the chamber The apparatus may further comprise means for the simultaneous firing of the actuators.

Preferably, the apparatus further comprises a nozzle shutter associated with each respective nozzle for closing that nozzle. The nozzle shutter may comprise a plunger housed in the deposition chamber and moveable between a closed position in which the head of the plunger aligns with the aperture of the nozzle and an open position in which the plunger is retracted into the deposition chamber. Preferably, the nozzle shutter comprises a bimorph laminate including at least two layers of piezoelectric material.

The apparatus may further comprise means for varying the size of the aperture of at least one of said nozzles. The means may comprise an iris-type diaphragm associated with the or each nozzle.

In a fifth aspect, the present invention provides a method of printing employing drop on demand ink jet apparatus comprising a droplet deposition head comprising a deposition chamber, actuator means associated in or adjacent the chamber for the application of pressure, a second, downstream chamber and corresponding actuator means, said method comprising the steps of:

actuating the actuator means associated with or adjacent to said down-stream chamber to create a pressure pulse in droplet deposition material contained in the deposition chamber; and actuating the actuator means associated with or adjacent to said deposition chamber to create a pressure pulse in droplet deposition material contained in the deposition chamber to cause droplet ejection from the deposition chamber.

Preferably, the pressure pulses create standing waves of different frequency in droplet deposition material contained in the droplet deposition head.

In a sixth aspect, the present invention provides droplet deposition apparatus comprising a deposition chamber, actuator means associated in or adjacent the chamber for the application of pressure, wherein there is provided a second, down-stream chamber and corresponding actuator means whereby pressure pulses are appliable independently to the down-stream chamber.

Preferably the pressure pulses are appliable synchronously to the deposition chamber by both said actuator means.

The actuators may be adapted to create standing waves of different frequency in droplet deposition material contained in the droplet deposition head.

Examples of the present invention will now be given, by way of illustration only and with reference to Figures in which:

FIGS. 9A, 9B, 9C and 9D show finite difference software model graphics showing pressure pulses in a feed chamber and a deposition chamber;

FIGS. 10A–10C show respectively, a plan and two cross section views of an end shooter of a deposition head according to a second embodiment;

FIGS. 14A–14C show various cross section views of a stack actuator;

Figure 1:
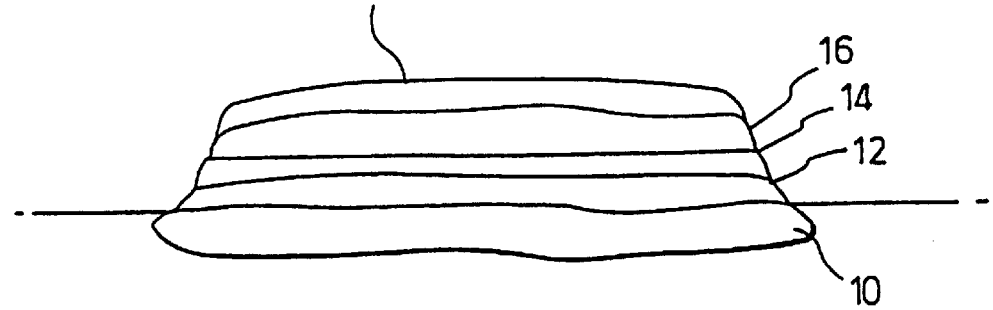
FIG. 1 shows multiple layers of deposition material at a coincident drop site on a print surface.

Referring to FIG. 1 there are shown multiple layers of deposition material at a coincident drop site on a print surface forming a 3D feature. The first layer 10 (lowest layer) is a surface pretreatment layer of epoxy acrylic which is absorbed into the paper surface to provide good adhesion for the next layer. The second 12, third 14 and fourth 16 layers above the first layer are build-up layers. The fifth layer 18 (highest layer) is a silicone-loaded layer providing a non-stick surface.

Figure 2:
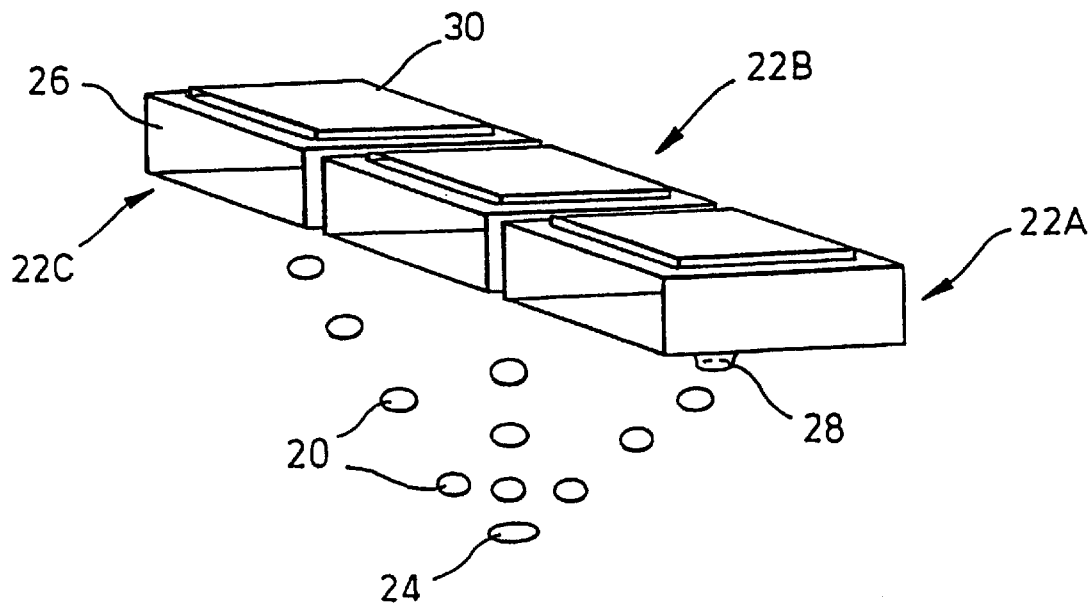
FIG. 2 shows three deposition heads directed to a coincident drop site on a print surface.

The 3D feature is formed on a printing surface using drop-on-demand technique to drop multiple droplets 20 of a deposition material from a deposition head 22 (FIG. 2). The deposition head 22 has a height above the printing surface between 5 μm and 1000 μm. The deposition head 22 holds the deposition material and ejects it a drop at a time on demand onto the print surface. The deposition materials comprises in excess of 40% solid matter and may be any one of the materials discussed in the introduction.

The 3D feature is formed with at least three different deposition materials and therefore at least three deposition heads 22A, 22B, 22C are needed. FIG. 2 shows an schematic array of three deposition heads 22 which direct their respective droplets to a coincident drop site 24 on a print surface. A deposition head 22 comprises a pressure generation cavity 26 with a profiled cylindrical nozzle 28 in one wall of the cavity and a PZT bimorph actuator 30 in an opposite wall. Each nozzle 28 defines a line of ejection which is representative of the path a droplet of deposition material will take upon ejection. The three nozzles 28 are shaped so that their respective lines of ejection coincide at a point on the print surface a known height below the deposition heads. A coincident drop site 24 allows the 3D feature to be formed without moving the array of heads. This solves the problem of aligning different deposition heads 22 to one drop site 24. A first deposition head 22A drops the first layer 10 and a short time later the second deposition head 22B drops the second 12, third 14 and fourth 16 layers respectively. After this the third deposition head 22C drops the fifth 18 and final layer.

Figure 3:
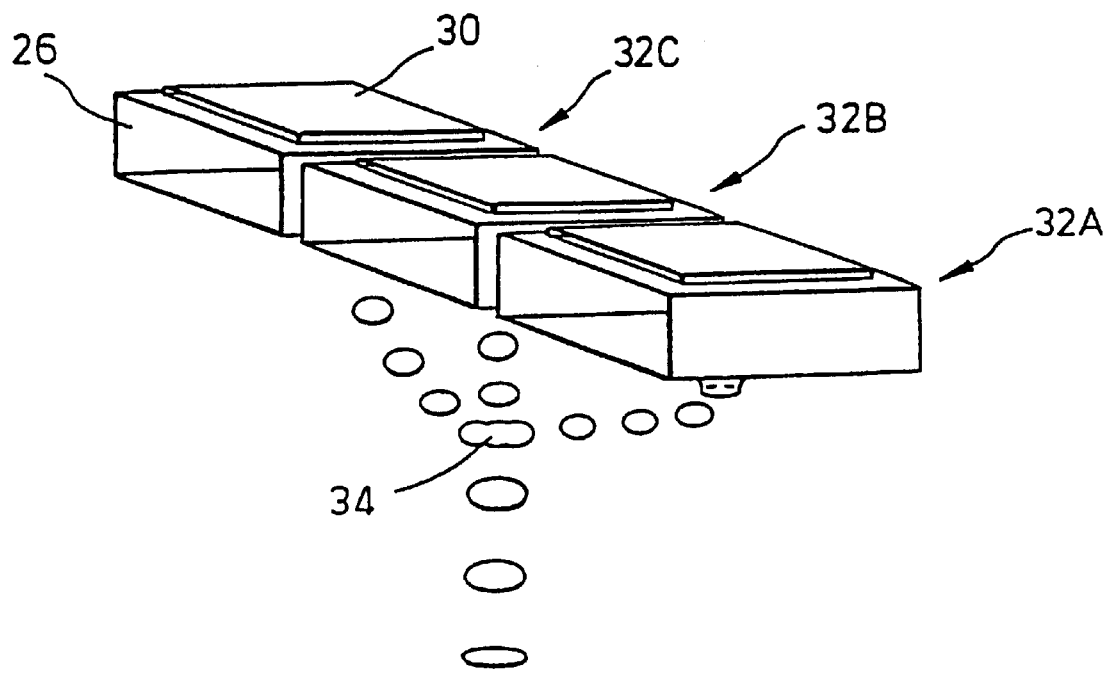
FIG. 3 shows three deposition heads directed to a coincident point above a print surface.

In FIG. 3 three schematic deposition heads 32A, 328, 32C directed to a coincident point 34 above a print surface are shown. This arrangement provides 'in-flight' mixing of different dispensing materials.

Figure 4:
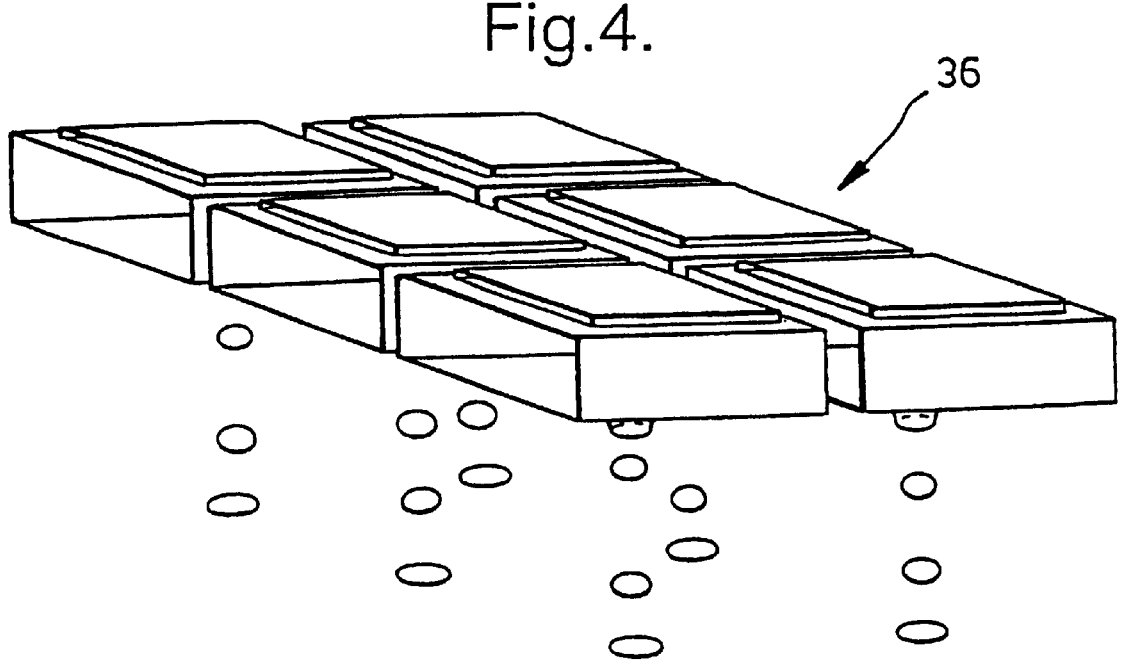
FIG. 4 shows an array of deposition heads.

FIG. 4 shows an 2D array of schematic deposition heads 36, each directed to respective drop sites rather like a convention printer head. This 2D array provides for the simultaneous deposition of multiple drops to form characters such as Braille characters.

Figure 5:
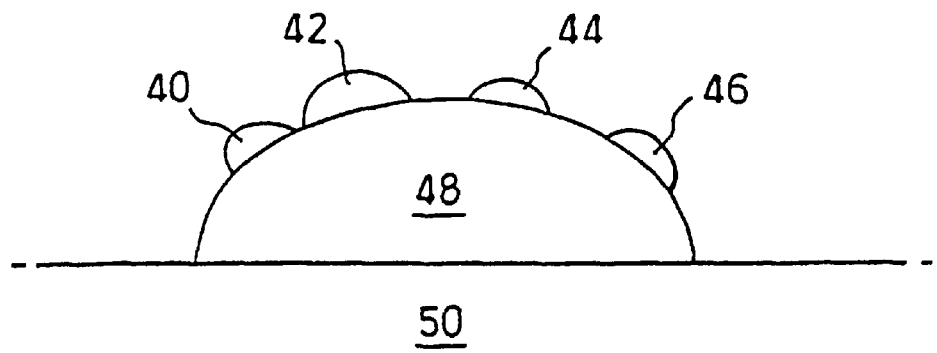
FIG. 5 shows a Braiile character with surface texture.

The nozzle may comprise means for directly varying the size of the nozzle aperture, such as an iris type arrangement. By varying the size of the aperture of at least one of the nozzles of a multiple nozzle droplet deposition apparatus, the deposition apparatus may deposit droplets of varying size. This allows for the creation of a 3D feature, for example, a Braille character, having a controlled surface texture. FIG. 5 shows such a feature, in which surface portions 40, 42, 44 and 46 are deposited on the surface of portion 48 formed on substrate 50. Portion 48 may be formed in a similar manner to the 3D feature shown in FIG. 1. Surface portions 40, 42, 44 and 46 are deposited from respective nozzles having either the same or different nozzle apertures, and may be formed from the same deposition material. Preferably, this deposition material has a controlled solubility in the deposition material forming portion 48.

By varying the number and size (i.e. height) of the surface portions, 3D features having a wide range of surface textures may be formed. This finds particular utility in the production of Braille maps, in which features representing roads, rivers, coastlines and such like may be formed with respective surface textures.

Another application lies in the deposition of distinct layers of materials having different etching rates for the production of a wide variety of articles, for example, microelectromechanical machined (MEMS) structure. The selective area deposition of different layers of materials on the same substrate provides the ability to etch a variety of shapes in the substrate using one or more common dry etching processes. FIG. 6 shows, by way of example, the formation of a tapered nozzle in a substrate.

Figure 6A:
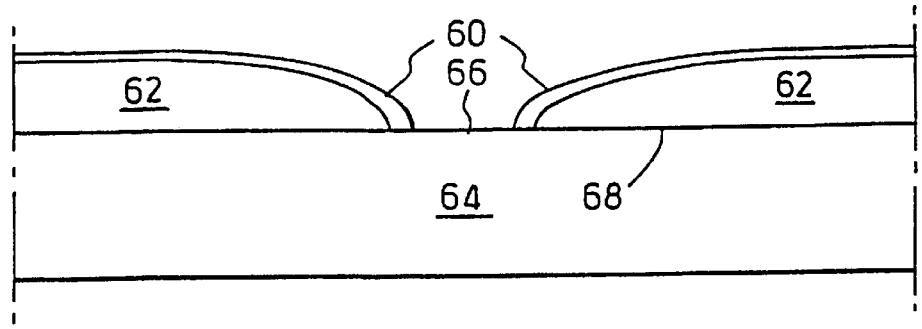
FIGS. 6A, 6B and 6C show stages in the formation of a tapered nozzle by etching.

FIG. 6A shows two layers 60 and 62 deposited on the surface of a substrate 64 for the formation of such a nozzle. The materials that may be deposited to form the layers 60 and 62 include photoresists, organically modified ceramics, ormosils, metallo-organic solutions (e.g. aluminium butoxide), radiation curable polymers (such as acrylates, urethanes, epoxies) and polyimides. Suitable etchants for these materials depend upon the nature of the application, such as the material to be etched and the desired resultant structure. Typical etchants include plasmas based on inert gases (argon, helium, etc.), fluorinated gases ($CH_4$, $CHF_3$, etc.), chlorinated gases ($CCl_2$, $Cl_2$, etc), iodinated gases and brominated gases.

In FIG. 6A a region 66 of the upper surface 68 of the substrate remains uncovered. For the chosen etchant, the deposition material from which layer 60 is formed has a lower etching rate than that from which layer 62 is formed and a lower etching rate than the material from which substrate 64 is formed. Layer 60 is deposited to a substantially uniform thickness on the surface of layer 62. Layer 62 is deposited such that the thickness of the layer decreases towards region 66 of the substrate 64; the thickness of this layer is selected to provide a specific delay time to control the desired profile of the etched feature.

Figure 6B:
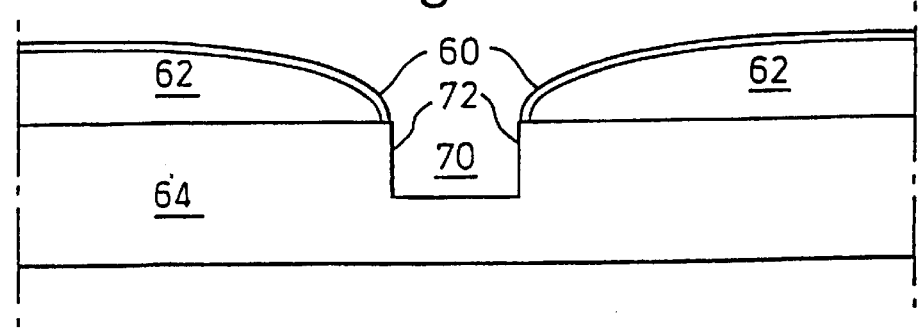
Figure 6C:
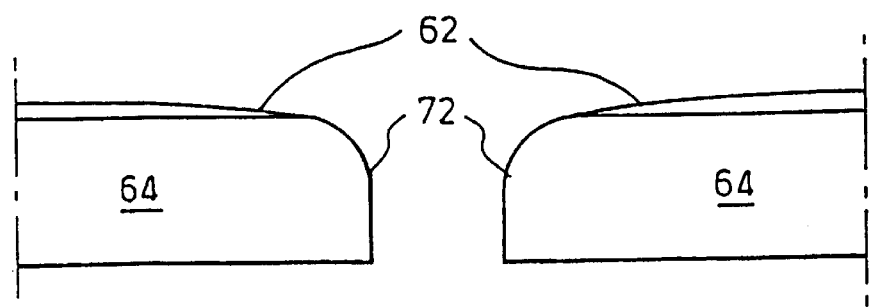

As shown in FIG. 6B, layer 62 remains unexposed until layer 60 has been removed by the etchant, at which point a well 70 has been formed in the substrate 64 by the etchant. As etching of layer 62 commences, an increased area of the upper surface 68 of the substrate becomes exposed to the etchant, resulting in tapering of the side walls of the well 70, as shown in FIG. 6C.

With the deposition of multiple layers of varying thicknesses and material type, it is possible obtain complex etch structures.

Figure 7:
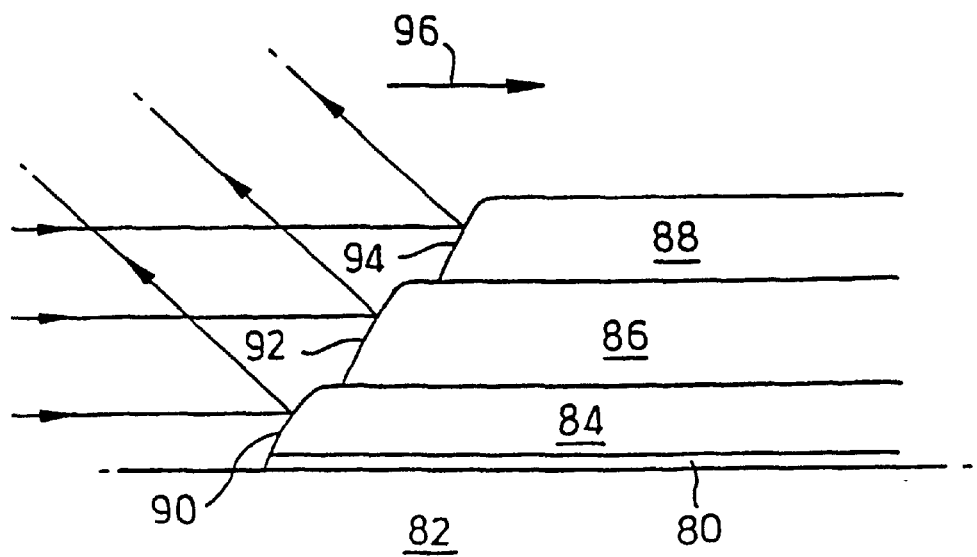
FIG. 7 shows a 45° mirror.

A further application lies in the formation of multi-layer optical devices, such as a 45° mirror as shown in FIG. 7. The mirror comprises a first surface layer 80 deposited on the substrate 82 to promote adhesion of the mirror to the substrate and/or to control surface wetting. Layers 84, 86, 88 . . . are subsequently sequentially deposited in a stepped arrangement such that the side wall 90, 92, 94 . . . of each layer is spaced in the direction of arrow 96 from that of the adjacent layer(s). The layer thickness and the spacing of the side walls influence the angle of the mirror and the nature of the scattering of light incident on the side walls; it may be necessary to subject the resultant structure to a heat treatment to coalesce the individual side walls 90, 92, 94 . . . to provide a smooth walled structure in order to produce the desired reflections. It is therefore possible, using the above deposition techniques, to deposit a feature with a variable angled wall to deviate light, such as a surface collector.

Complex refractive index patterns can also be achieved with the deposition of regions of materials having different refractive indices, which may provide a means of filtering or semi-filtering of light incident thereon.

Figure 8A:
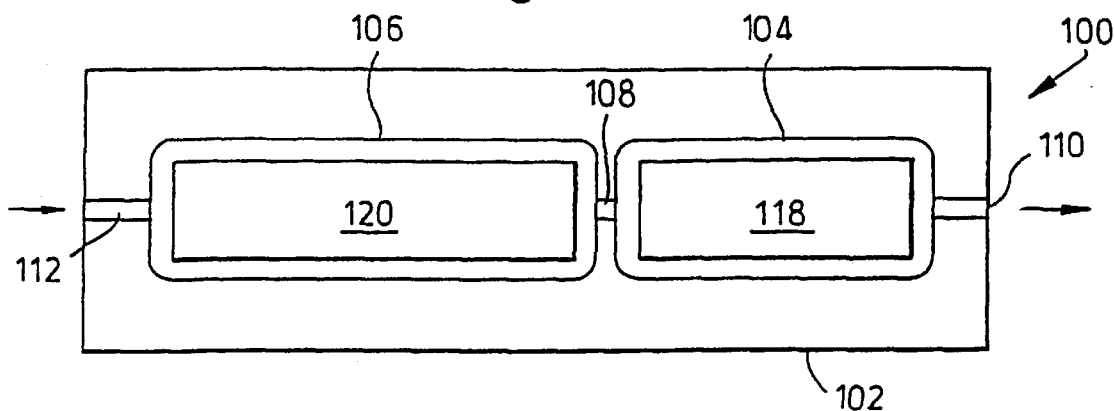
FIGS. 8A, 8B and 8C show cross sections of a dual-in-line deposition head according to a first embodiment.
Figure 8B:
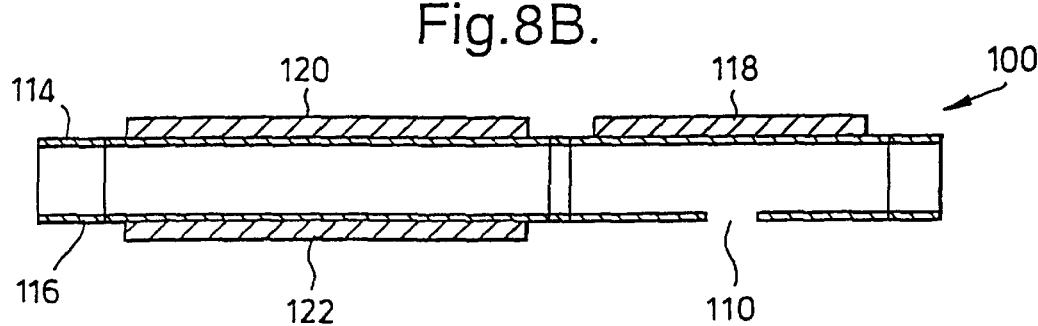
Figure 8C:
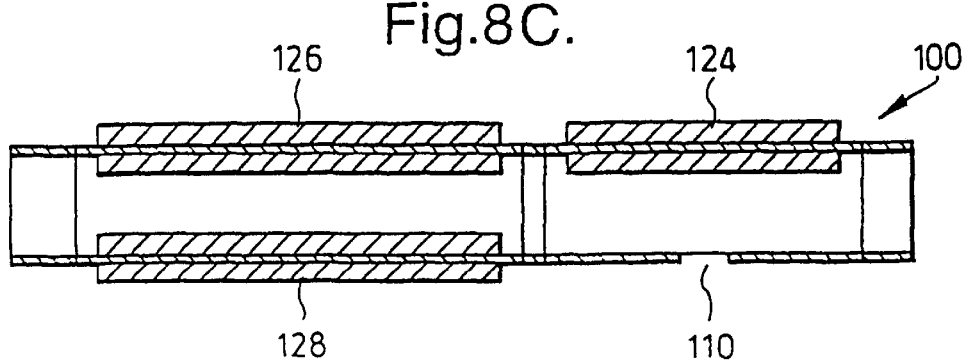

FIGS. 8A, 8B and 8C show a first embodiment of deposition head, this being a dual-in-line deposition head 100. The dual-in-line head 100 comprises a chamber body 102 having a deposition chamber 104 and feed chamber 106 formed therein and connected by a channel 108. The deposition chamber comprises an outlet or nozzle 110 in a wall at one end of the deposition chamber as in FIG. 8A (an 'end-shooter') in one variation of the embodiment. In another variation of the embodiment the outlet or nozzle 110 is in a wall on the side of the deposition chamber in FIGS. 8B and 8C (a 'side-shooter'). The feed chamber 106 comprises an inlet 112 for the deposition material which is stored in a larger reservoir (not shown). Defining a wall or wall of the cavities are top and bottom membranes 114, 116 which are connected to and are supported by the chamber body. The membranes 114, 116 are flexible and resilient so that a pressure pulse may be transmitted through them into the cavities.

The top membrane 114 of the deposition chamber 104 supports a deposition actuator 118, the top membrane of the feed chamber supports a feed actuator 120 and the bottom membrane 116 of the feed chamber supports a bottom actuator 122. Each actuator 118, 120, 122 comprises a bimorph laminate including two layers of piezoelectric material arranged such that when a potential difference is applied across them one expands and the other contracts providing a flexing action rather like a bimetallic strip. If the potential is pulsed then the flexing action provides a pressure pulse incident on the membrane which is then transmitted into the chamber.

In another variation of the embodiment dual actuators 124, 126, 128 are provided on the membranes as in FIG. 8C. Using more than one actuator in parallel reduces the voltage required for a given pressure pulse. In FIG. 8C one actuator is positioned on each side of the membrane but it is also possible to have composite actuators as shown in FIGS. 14A–14C. It is advantageous to have an actuator comprising several thinner layers of piezoelectric material than one thick layer as the thinner layers will assure large capacitances promoting a high energy transfer at low operating voltages.

A deposition cycle is as follows. The cavities are initially full of deposition material. A potential difference is applied across the deposition control actuator and a pressure pulse is transmitted into the deposition chamber 104. The pressure pulse forces a droplet of deposition material from the deposition chamber 104 through the outlet 110 and onto a print surface adjacent the outlet 110.

Simultaneously or just after the deposition control actuator 118 is pulsed, a synchronous signal pulses the feed actuator 120 and bottom actuator 122 which forces deposition material from the feed chamber 106 into the vacant space in the deposition chamber 104 left by the ejected droplet. The feed chamber 106 is replenished from the reservoir and a new deposition cycle is ready to start.

Figure 9A:
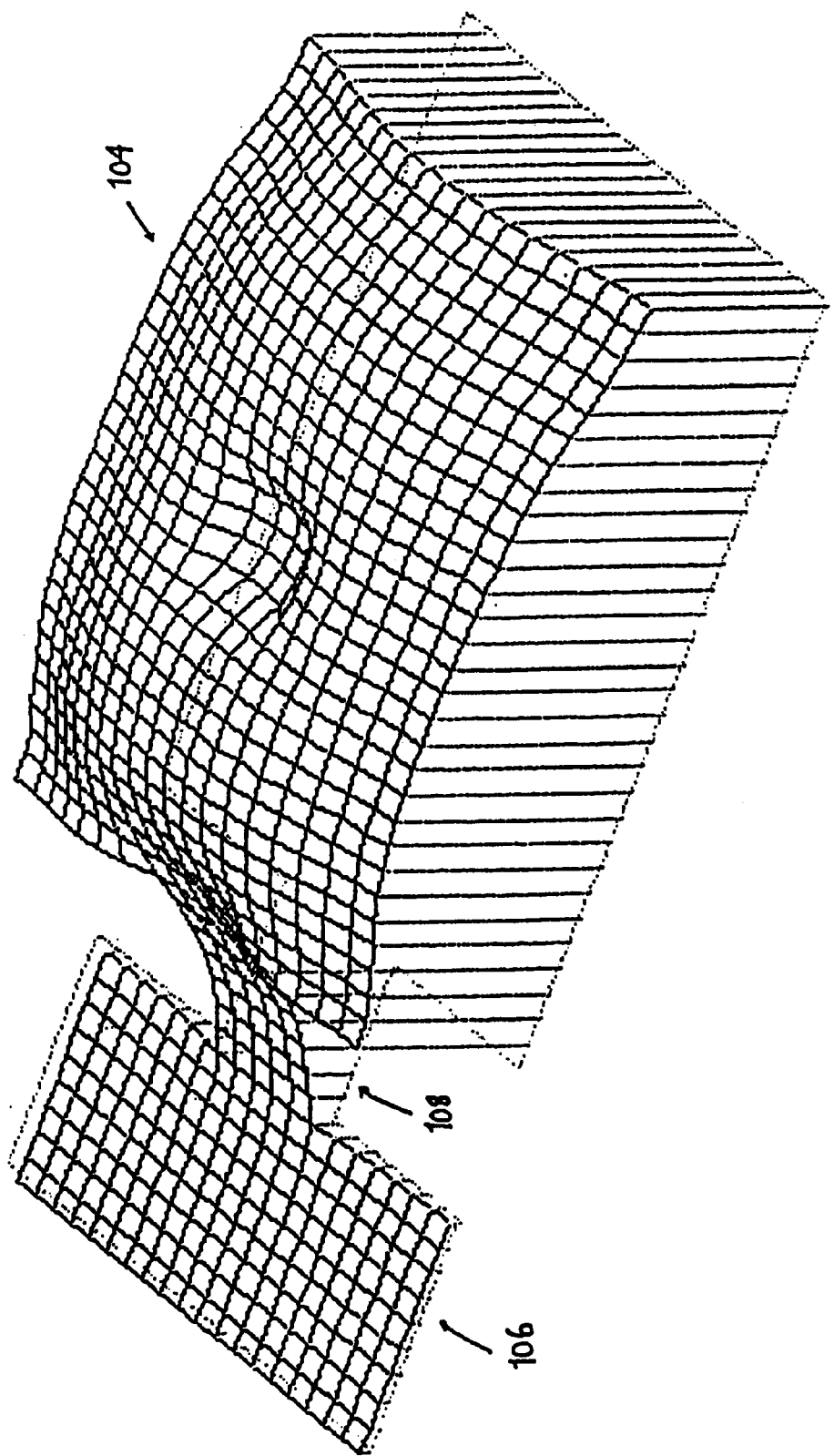

With this deposition cycle, when the deposition control actuator is pulsed, deposition material may be forced into the feed chamber 106 as well as through the outlet 110. In any event, pressure induced in the deposition chamber 104 will be transferred into the feed chamber 106 through the duct 108, as represented schematically in the finite difference software model diagram shown in FIG. 9A, in which the height of the columns represents the pressure in the deposition chamber 104, feed chamber 106 and the duct 108.

This detrimental "loss" of pressure in the deposition chamber 104 may be obviated by actuating the feed chamber 106 a short period of time in advance of the actuation of the deposition chamber 104, as shown in FIG. 9B. This creates a pressure pulse which flows through the duct 108 into the deposition chamber 104. This pressure pulse allows-for control of the deposition material in the deposition chamber 104, in particular the meniscus of the deposition material at the aperture of the outlet 110, the resultant shape of the meniscus depending on the size of the pressure pulse.

Figure 9C:
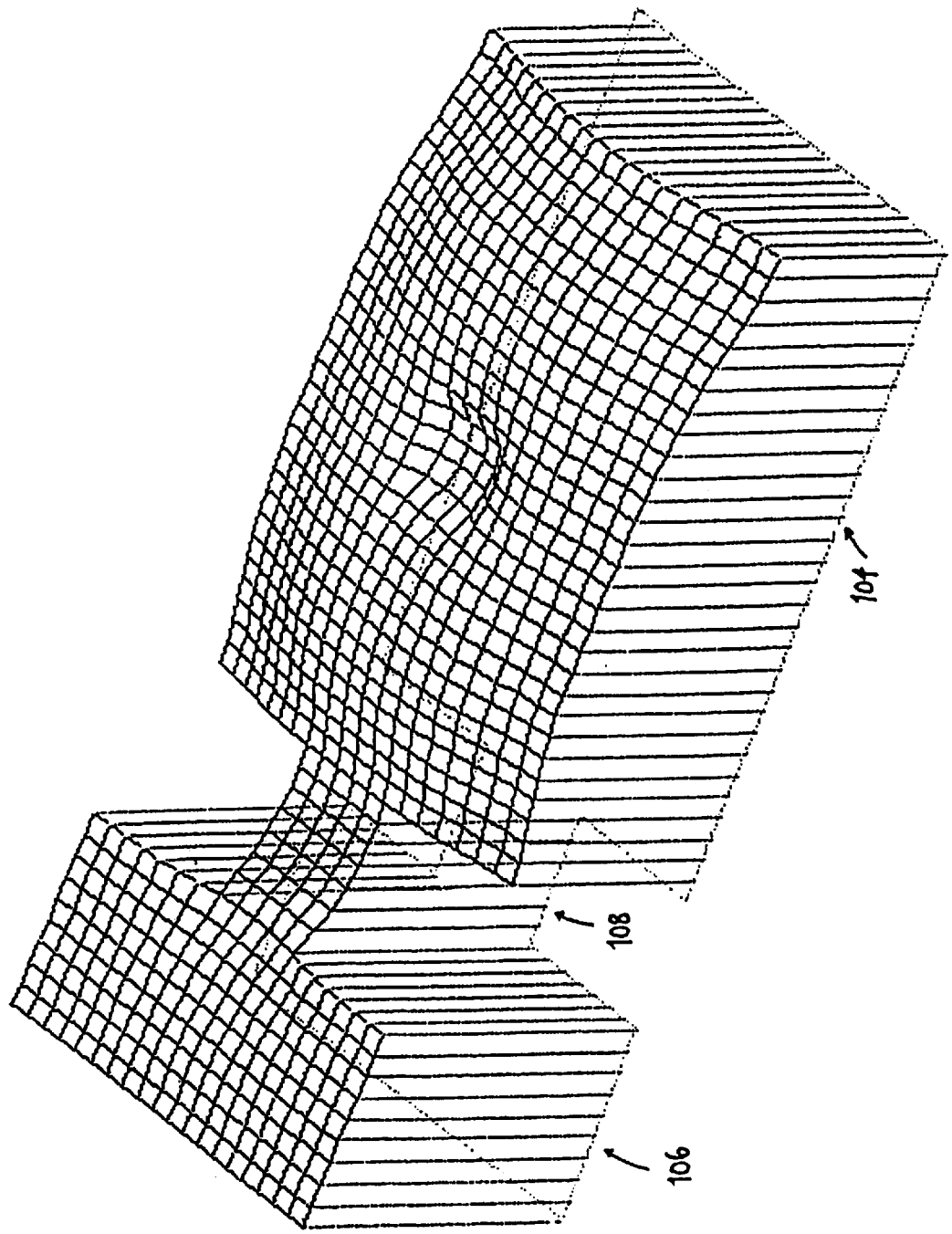

The actuation of the deposition control actuator 118 can be timed to coincide with a particular pressure condition induced in the deposition chamber 104 by the actuation of the feed actuator 106. FIG. 9C shows the pressure in the deposition chamber 104 and the feed chamber 106 when equal pressures are applied to both chambers. Pressure equalization occurs on both sides of the duct 108, resulting in no net flow of deposition material through the duct. By applying a greater pressure pulse to the feed chamber 106, a flow of deposition material through the duct 108 towards the outlet 110 can be ensured.

Figure 9D:
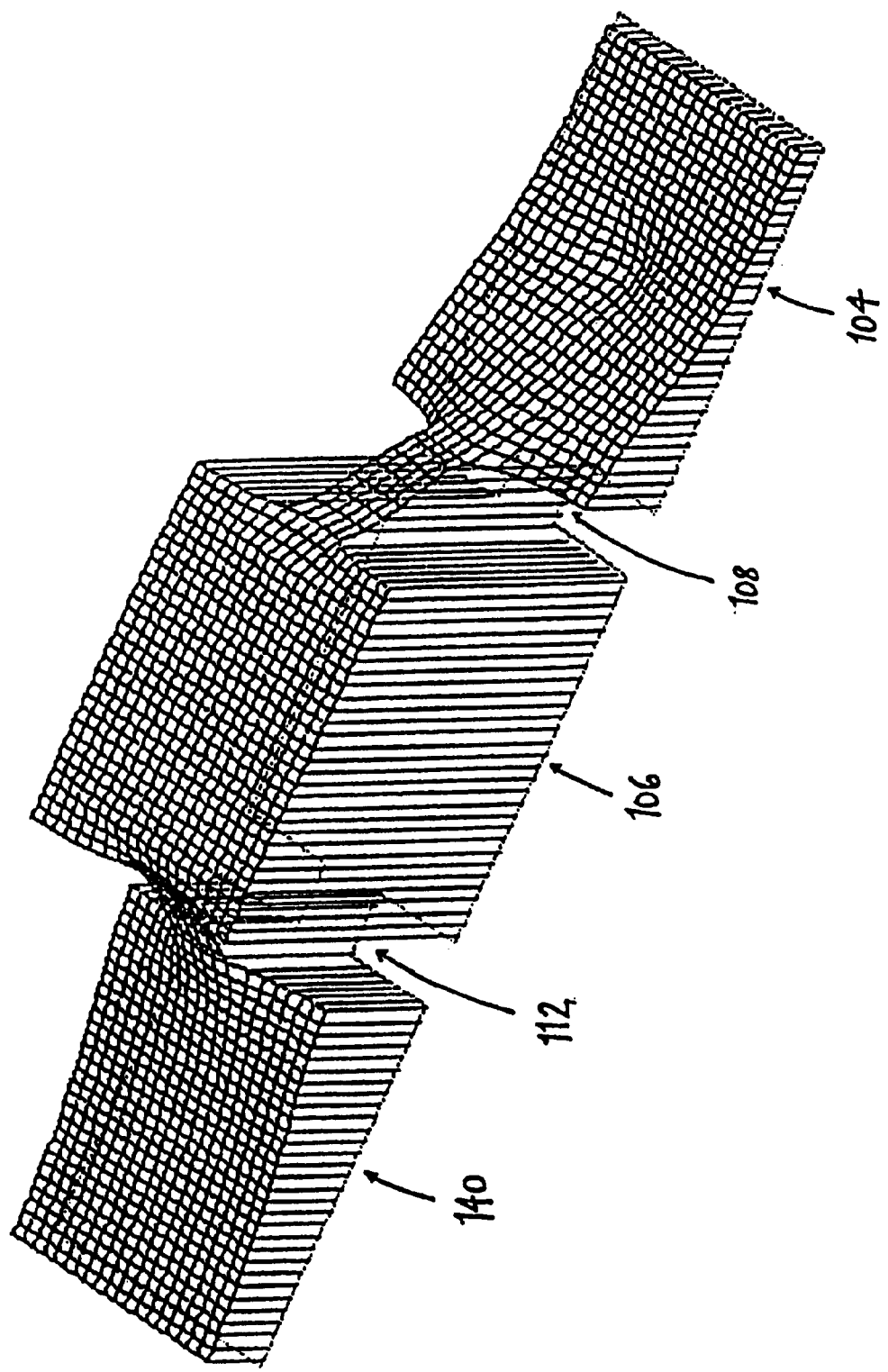

FIG. 9D shows the effect of the pressure pulse shown schematically in FIG. 9(B) on the droplet deposition material reservoir 140. Whilst some pressure is transferred from the feed chamber 106 to the reservoir 140, this loss of pressure can be controlled by controlling the geometry of the inlet 112.

When the actuators of the deposition chamber 104 and the feed chamber 106 are actuated simultaneously, it is particularly advantageous to synchronise the standing wave patterns set up in the fluid by these actuators so that constructive interference of the wave patterns occurs during the ejection of a droplet from the outlet 110 in order to maximise the pressure acting on the droplet during ejection, and so that destructive interference of the wave patterns occurs during the "break-off" of the droplet from the deposition material remaining in the deposition chamber 104 in order to minimise the pressure acting on the droplet. This provides for increased energy efficiency of the droplet deposition head. The frequency of the pressure pulse applied to the deposition chamber 104 and the feed chamber 106 may be different; it is preferred that the frequency of the pressure pulse applied to the feed chamber 106 is greater than that of the pressure pulse applied to the deposition chamber 104 in order to eliminate fluid inertial effects on drop firing.

A second embodiment of a single chamber end-shooter arrangement is shown in FIGS. 10A–10C. A deposition head 150 comprises an elongate chamber tapering from a wide reservoir section 152 through a pressure generation section 154 to a narrow nozzle section 156. Three actuators are provided: a transport assist actuator 158 acting on the reservoir section 152, a pressure generation actuator 160 acting on the pressure generation section 154 and a droplet control actuator 162 acting on the nozzle section 156. The nozzle section 156 communicates with the pressure generation section 154 through a throttle 164 acting as a one way valve for the deposition material. The nozzle is a constrained cylindrical nozzle 1mm diameter. The reservoir section communicates with the pressure generation section 60B by ducting 66. The deposition cycle is similar to that of the first embodiment. The cavities are initially full and a pressure pulse is applied to the nozzle section 156 to eject a droplet therefrom. Synchronised pulses are applied to the pressure generation 154 and reservoir section 152 respectively so that a flow of deposition material is set up through the chamber to replenish the nozzle section 156.

Figure 11:
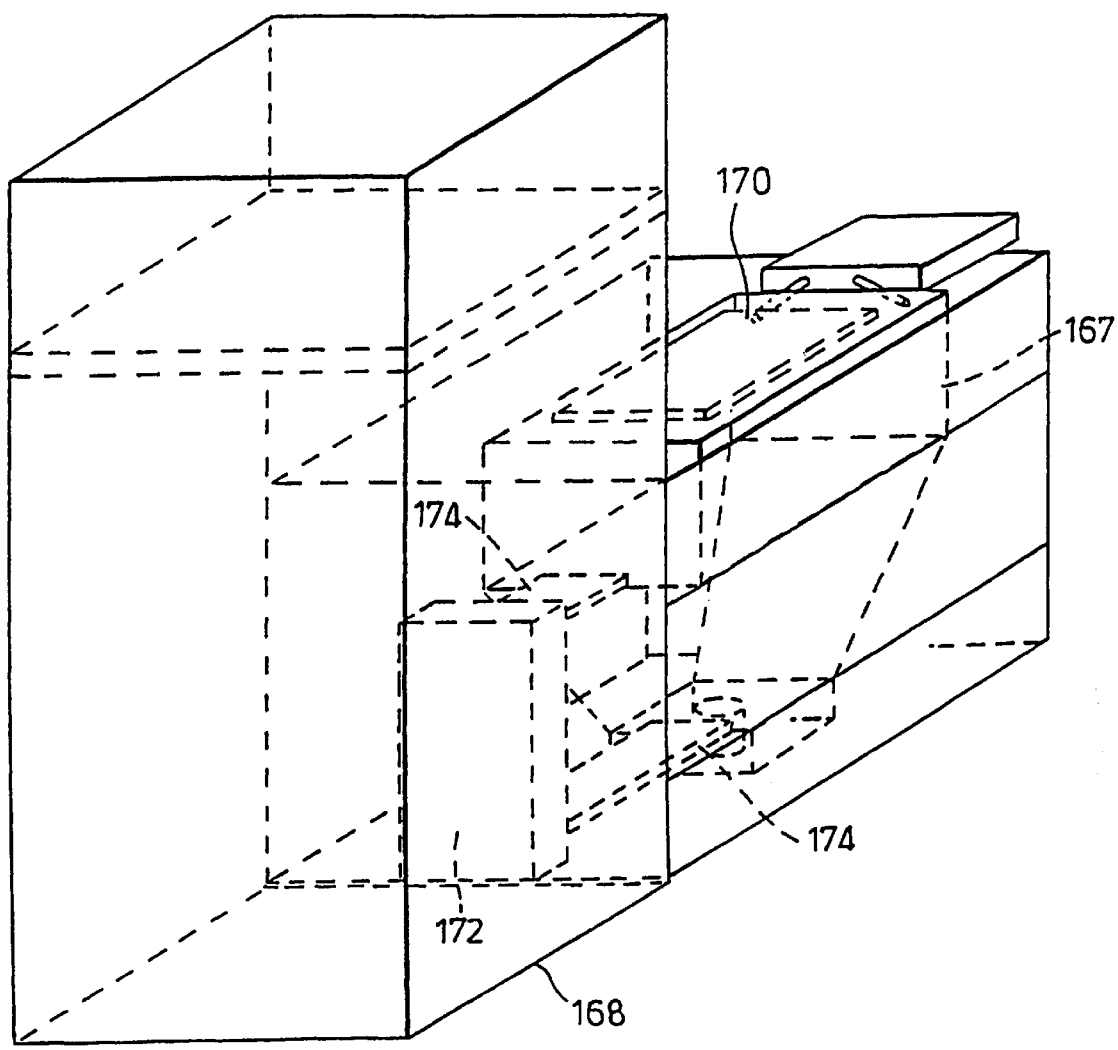
FIG. 11 shows a perspective view of a deposition head according to a fourth embodiment.
Figure 12:
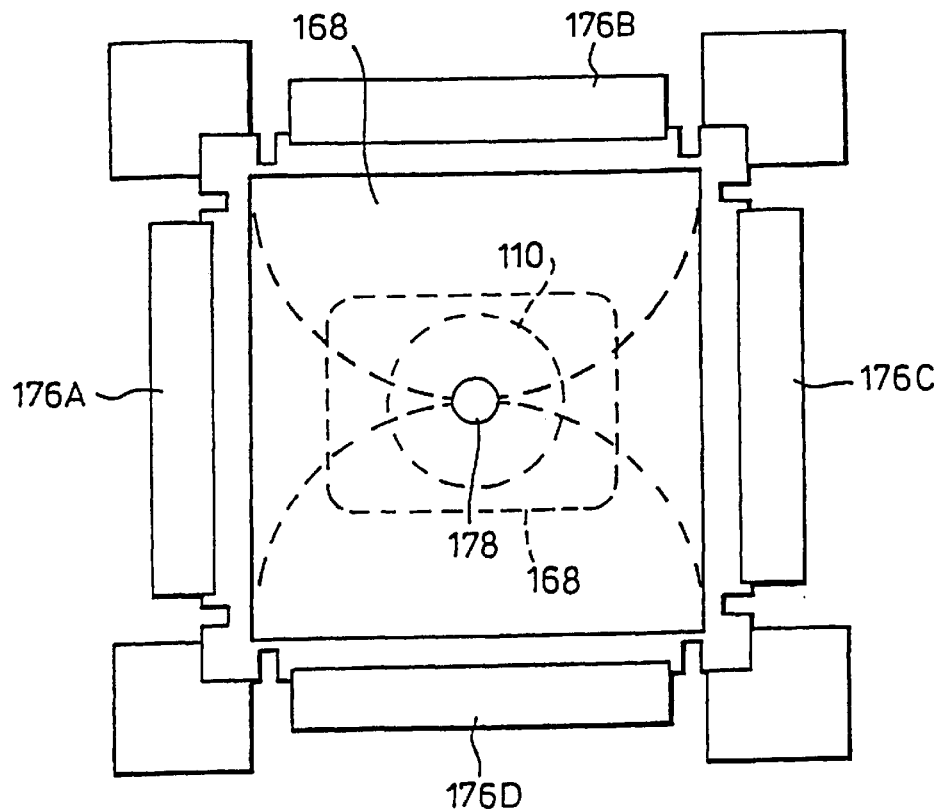
FIG. 12 shows a plan view of a four plate actuator deposition head according to a third embodiment.
Figure 15:
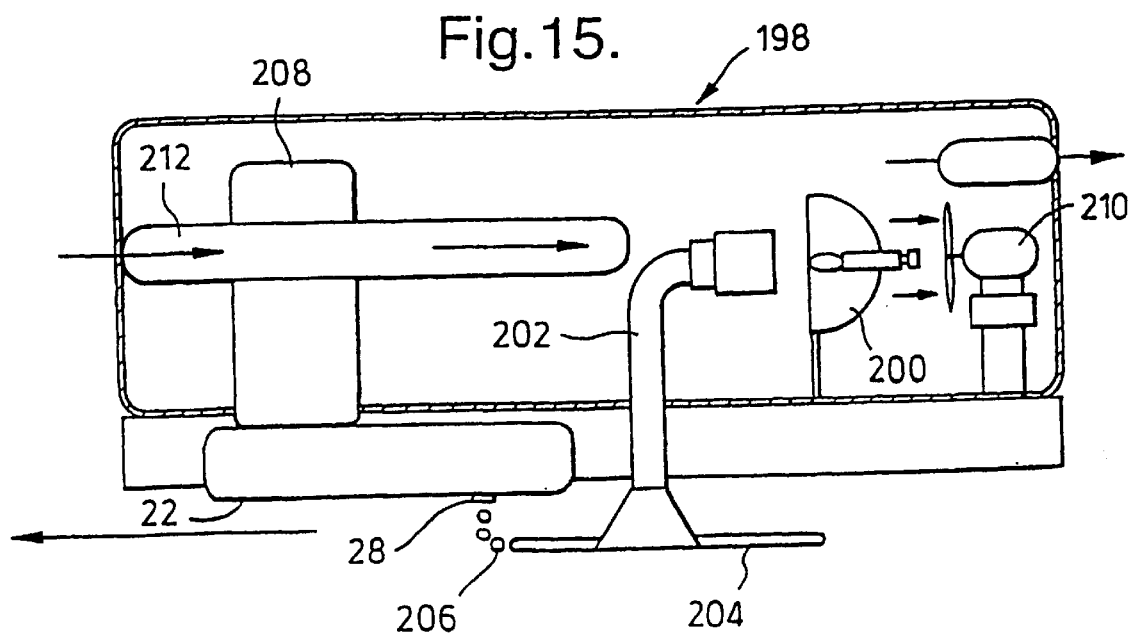
FIG. 15 shows a cross section view of a deposition head in combination with a UV light source.
Figure 13A:
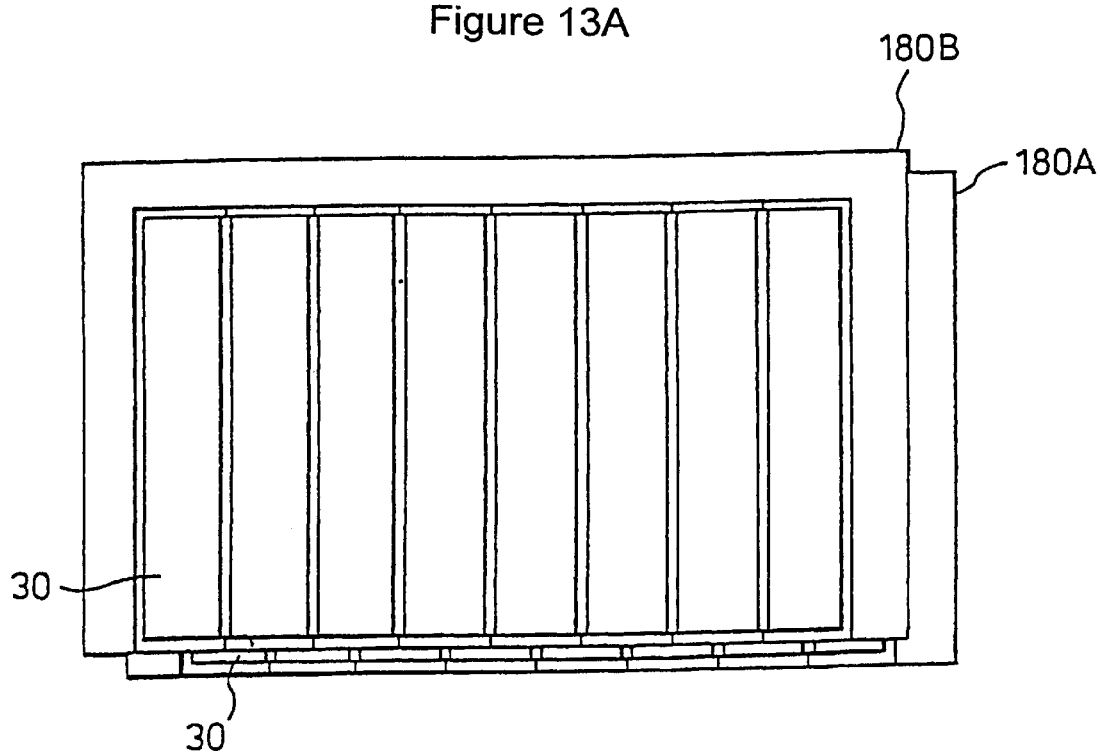
FIGS. 13A and 13B shows a plan and cross section view of an array of deposition heads.
Figure 13B:
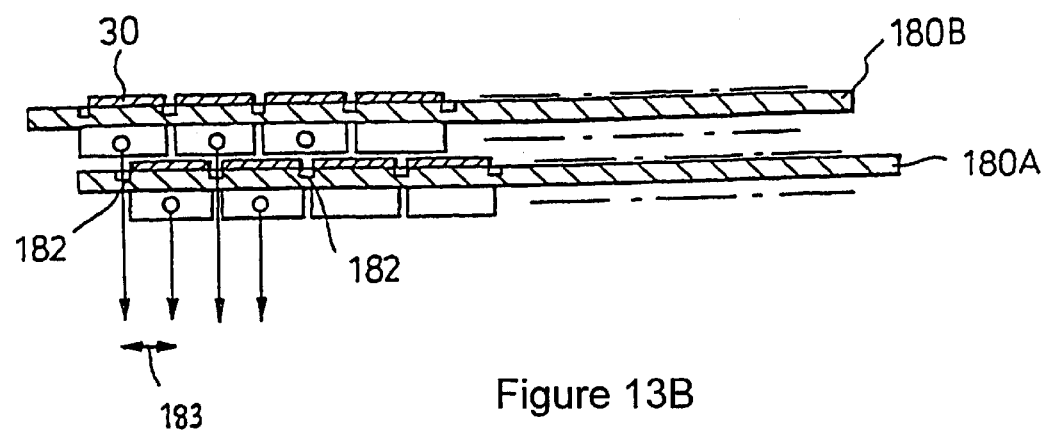
Figure 16A:
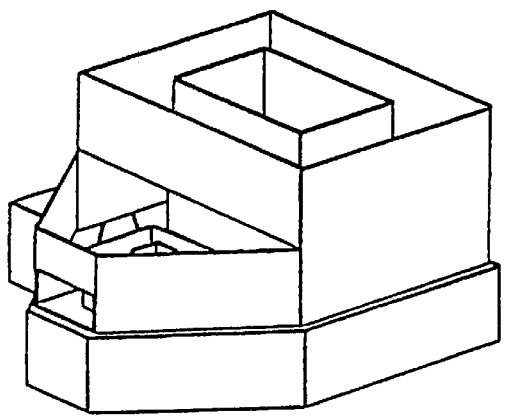
FIGS. 16A and 16B show, respectively, an assembled and an exploded perspective view of a further embodiment.
Figure 16B:
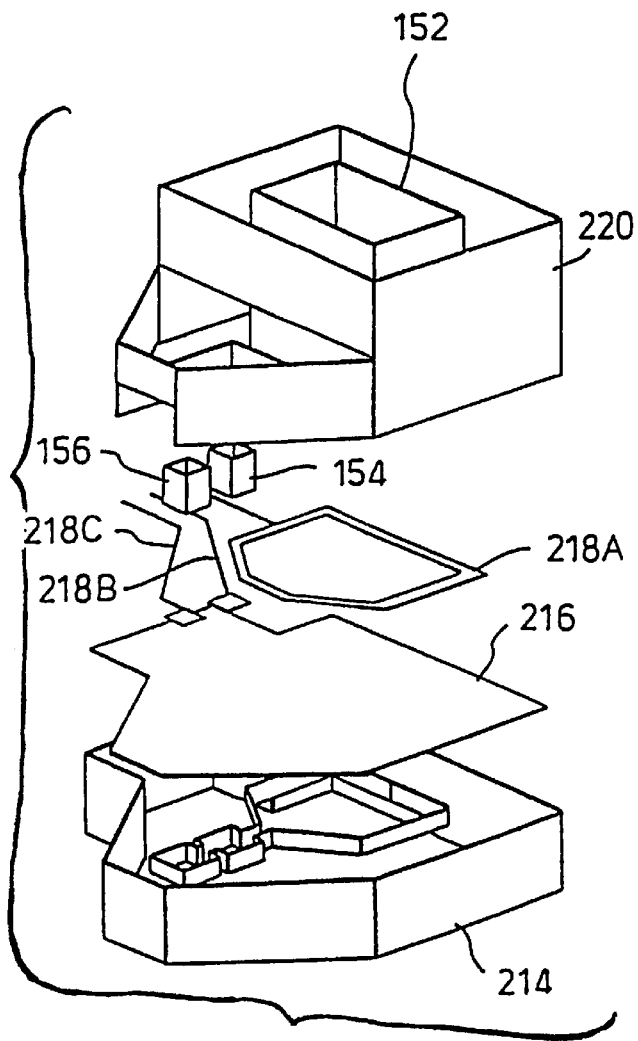

A third embodiment provides a dual chamber deposition head comprising a deposition chamber 167 and a feed chamber 168 as shown in FIG. 11. The deposition chamber 167 has a deposition actuator 170 positioned in a top wall of the chamber and a nozzle in the opposite bottom wall. The side walls taper from a wide top section to a narrow bottom section. A deposition material reservoir comprises an actuator in a wall and a manifold section 172 which communicates with deposition chamber through two ducts 174 connecting with the top and bottom sections of the deposition chamber 167. Similar pressure pulses may be applied to this deposition head as described with reference to the dual-in line deposition head 100. In an alternative structure of this third embodiment, the feed chamber 168 may form part of a sealed "cavity" that need not be filled with droplet deposition material but with any suitable material for the efficient transmission of acoustic energy to the deposition chamber. In this structure, droplet deposition material may be fed directly into the deposition chamber.

A fourth embodiment provides a dual-in-line deposition head having a reservoir chamber including four actuators 176A, 176B, 176C, 176D on side walls as shown in plan in FIG. 12. The feed chamber 168 communicates with a deposition chamber 167 through a restriction throttle 178. In this arrangement the four actuators can be adapted to maximise the volume change in the reservoir chamber or minimize the drive voltage by pulsing all four actuators simultaneously.

FIG. 13 shows how a first 180A and second 180B 2D array of deposition heads are positioned in a staggered arrangement to achieve 250 dots per inch resolution 183 with a nozzle diameter of 150 μm. The first array 180A comprises gaps or holes 182 between the deposition heads and the second array 180B is staggered above the first. The gaps or holes 182 of the first array 180A are aligned with the nozzles in the second array so that droplets can pass through without obstruction.

FIG. 14 shows a composite actuator structure. As mentioned in connection with FIG. 8C, more than one actuator in parallel reduces the voltage required for a given pressure pulse. A transformer stack 184 provides an increased efficiency actuator, comprising six layered actuators 30. Using small transducer thicknesses will assume high capacitances promoting a high energy transfer, at low operating voltages. The poling direction is shown by the arrow 186. Electrical contacts 188A, 188B are positioned on the top and bottom of each actuator 30 and are sandwiched between the other actuators 30 in the stack 184.

A voltage applied to parallel connections 190 causes displacement of the actuator. In this embodiment the transformer stack 184 is supported by a metal membrane 196. The cavity 26 is bounded by the membrane 196 and a nozzle plate 192 having a multiple nozzle output 194.

FIG. 15 shows a deposition head 22 as part of a X-Y plotter system 198. The plotter 198 includes a quartz-halogen lamp 200 supplying UV light through an optical fibre 202 to the printing surface 204 onto which the droplets 206 are deposited. This system 198 subjects the deposition material to radiation treatment after it has been deposited for the purposes of curing the material or other processing.

The nozzle 28 has a great influence on the way in which deposition material is deposited. The angle of the nozzle 28 with respect to the chamber body defines the line of ejection of the droplet 206 as is discussed with reference to FIGS. 2 and 3. The shape and surface of the nozzle 28 determines the energy needed to eject the droplet from the nozzle. A polished nozzle 28 will have a lower surface energy than an unpolished nozzle and therefore will more easily release a droplet.

A low surface energy nozzle exit can be achieved using a variety of liquid coatings (i.e Montedison Galydene), however a more practical route is to gravure print a silicone loaded acrylic UV curing film on to the front of the nozzle plate (this exhibits a surface energy of less than or equal to 19 dyn cm (190 μjoules) ). This is essentially non-wetting to epoxy and urethane acrylic deposit materials. One advantage of using such coating materials is that the nozzle can be made of both copper (wetting) and laminate material (wetting or non-wetting) giving more flexible control over the direction of drop ejection. Both materials can be obtained in a variety of metal and laminate core thicknesses.

The nozzle may incorporate an integral piezoelectric bimorph nozzle shutter (not shown) to act as a sealant for the deposition material retained in the nozzle. This feature prevents ultraviolet light and water vapour from entering the nozzle when not in use. The shutter may comprise a plunger retained in the deposition chamber of the deposition head. Such a plunger means has a relative coaxial sliding fit with the nozzle whereby a plunger head aligns with the nozzle aperture to close the nozzle and in an open position the plunger is retracted into the chamber. By controlling the position of the plunger head with respect to the nozzle aperture, the deposition chamber size can be controlled thereby allowing an adjustable droplet of deposition material to be ejected.

FIGS. 16A and 16B show a further embodiment of a deposition head in an exploded perspective view. Lower support structures 214 comprise reservoir section 152, a pressure generation section 154 and a nozzle section 156. The sections have a common top wall comprising an actuator membrane 216 and overlying the membrane are electrode layers 218A, 218B, 218C for the activation of the membrane. Top support structure 220 comprises an ink reservoir supplying the reservoir section 152.

Another additional feature of any of the embodiments is a deposition control electric field generator (not shown). This generates an electric field in the vicinity of the nozzle to control the shape of a meniscus of the electrically responsive deposit materials. This is used to exert a pulling force on the droplets so that less energy is required by the actuators to eject the droplets from the nozzle chamber.

By way of example it is illustrative to consider the application of forming a tactile map using UV curing polymer dispensed from a single dot, multiple drop print head. The desk-top plotter of FIG. 15 employs digital deposition servo drive motors for x-axis and y-axis transport motion. A replaceable polymer deposition head 22, along with its associated polymer reservoir cartridge(s) 208, resides on the axis drive carriage plate. Integrated into the carriage plate is a set of annular fibres 202 that permit close proximity UV and infrared radiation for surface pre-treatment, in-flight treatment and/or post deposition treatment. The annular radiation emitters are fed from a fibre optic 202 that is coupled at the opposite end to a suitable light source 200. The surface 204 to be coated is electrostatically secured to the plotter deposition frame. The use of a cooling fan 210 and cooling air directional ducting 212 maintains the x-y plotter at a working temperature.

The characteristics of the map to be produced are drawn on a computer screen using a suitable draw facility software package or are imported into the plotter drive computer memory using a digital scanning facility (with on board character recognition capability, as required). Typical dimensions of the features to be produced are:

| | |
|---|---|
| Braille dot diameter | 1.5 mm |
| Braille dot height | 200 μm (ideal 600 μm) |
| Border width | 0.5 to 3 mm |
| Border height | 200 to 300 μm |

The finished map is digitised and the appropriate x-y co-ordinates are fed to the plotter interface so that the required surface feature is formed at the location requested. The drive waveform to the drop dispense pressure generator (polymer dispense head) is synchronised to the x-y placement coordinates, so that the required 3-D features are accurately placed. For specific surfaces it is possible to employ an adhesion enhancing liquid pre-treatment prior to depositing the required polymeric pattern.

The droplet deposition apparatus may further comprise an integral continuous or pulsed UV (also in conjunction with infrared radiation—thermally assisted curing) light source with illumination of the dispensing drop via a fibre-optically fed focusing annulus located in close proximity to, or surrounding, the dispensing head (or nozzle array). Note that in the limit (high value or high polymer dispense volume applications) this light source is could be an excimer laser that employs a rotating mirror arrangement to create a fine line UV light beam that is continuously rotating around a selectable circular radius or more complex elliptical shape. The annulus can be formed by using a suitable retaining mould in the Y-spider plate, and with the use of a pre-shaped top casting cap, PMMA or alternative polymer can be injected into the unit for a UV transmitting annulus with a particular optical focusing. It is envisaged that a suitable light source can be manufactured that would enable the annulus to be fed from a source that is also integrated onto the y-axis carriage plate.

The deposition materials that are of primary interest are based on epoxy and urethane acrylics (oligomers), cationic resins, and probimide and thioline aromatic polymers. Such materials are employed in the manufacture of paints, varnishes, organically modified ceramics (ORMOCERS), organically modified silicates (ORMOSILS), liquid crystal siloxanes, photoresists, and other liquid plastics and polymers. The viscosity range of interest is 1 to 10,000 centipoise (cps) based on 100% solids and diluted systems. The surface energy (tension) of such materials is typically in the range 30 to 75 dynes cm$^{-1}$ and consequently a low surface energy nozzle is required to minimise surface wetting and the voltage needed to expel a drop from the nozzle.

Such a nozzle may be a cavity nozzle channel in the deposition head with an integral extended PTFE-based low surface wetting energy to achieve control over the degree of surface that can be wetted by the exiting polymer. The PTFE being applied as a thin film which is the photolithographically patterned and subsequently dry etched to achieve the desired variable wall thickness cylinder. This ensures reproducible and reliable drop firing and placement.

Multiple duct polymer supply feed to the pressure generation and droplet control (feedback loop) cavities may provide flow conductance control (critical damping), whilst minimising acoustic impedance mismatch.

Polymer reservoir inlet cavity actuation may be provided to facilitate control over the polymer replenishment process.

An enhancement to the embodiments is provided by dispensing the material in a vacuum to facilitate the deposition of droplets of diameter substantially less than or equal to 1 $\mu$m. If this were attempted in air then the drag induced by air resistance would distort the drop and impair its dimensional stability and placement accuracy. This would necessitate the fabrication of a thin film piezo electric actuator for the nano jetting of polymer-based materials and other dispensable solutions. This actuator design employs thin and thick film ferroelectric material to form the pressure generation cavity.

Several ways of manufacturing the deposition chamber are envisaged.

A. Silicon Micro-Electromechanical Structure Machining

This is the favoured method and the steps are as follows.

1. Prepare and polish both sides of Cz float zone silicon substrate which is to form the chamber body. Preferably the substrate is p-type boron doped, 100 mm diameter and <110> orientation wafer. The wafer is preferably edge accurate to +/−0.1 and has an M1-92 SEMI surface finish. The thickness of the wafer is preferably 525 +/−15 $\mu$m thick. Preparation includes treatment with a degreasant and D.I water rinse, a solvent rinse and D.I. water rinse and then a buffered HF surface oxide wet etch.

2. Next boron is thermally in-diffused into the wafer for etch stop patterning using a conventional thermal diffusion tube process at 1000° C.

3. A polyimide membrane is deposited by spin coating Toray Photoneece or equivalent photoactive liquid polyimide to a thickness 25 $\mu$m.

4. Next the membrane layer and PZT base contact are deposited on the polyimide by, for example, magnetron sputter deposition of a Ti—Cu—Au trilayer. Thicknesses are preferably Ti—100 Å, Cu—30Å, Au—100 Å.

5. Photolithographic patterning of the base contact layer is achieved by, for example, spin coating with photoactive AZ 1350J resist and then exposing the base metal pattern. The resist is developed and rinsed before dry or wet etching the pattern.

6. A silicon nitride protective coating may then be deposited by PECVD. For example using the following parameters: $SiH_4+N_2$, deposition pressure=200 mTorr, Platen power=200 watts, Deposition temperature=325° C., Deposition rate=1000 Å per minute and film thickness=1 $\mu$m. High density, stoichiometric, ECR-CVD grown silicon nitride is available as an alternative protective barrier.

7. The rear of the substrate is spin coated with a photoactive AZ 1350J resit.

8. Photolithographic patterning of crystallographic etch pattern is carried by exposing crystallographic etch windows pattern and developing/rinsing and wet etching using BHF solution—10:1 etch at 25° C.

9. Crystallographic etching of cavities and transport ducting and nozzle is carried out using an orientational alignment to better than 0.05°. Pattern transfer accuracy should be better than 0.5 $\mu$m. Immerse the substrate in etching solution contained in etching tank, for example, KOH (44 g), D.O. water (90 ml), IPA (10 ml). The etch temperature should be 85° C. and etch rate 1 $\mu$m per minute. Etched wafer should be acid cleaned after crystallographic etching is complete then reverse flush rinsed in D.I. water.

10. The silicon nitride coating is stripped off from both surfaces using a $H_3PO_4$ or HF based etching solution dependent upon the method used to deposit the silicon nitride protective coating.

11. The PZT (piezoelectric actuators) stack are bonded to patterned base contact using Epo-Tek H31 electrically conductive one component epoxy. Roller transfer adhesive and apply pressure to ensure very thin bond line and cure at 120° C. for 2 hours.

12. Electrostatically bond two halves of a silicon support plate (which seals the structure) by depositing alkali loaded oxide on to support plate surface and locating the two halves in register using suitable jigging and optical/infrared alignment. Apply pressure and high (about 450 volts) DC potential for 5 minutes.

13. Dice completed wafer into individual components using conventional high speed silicon wafer dicing applied to separate the individual heads.

14. End polish the nozzle exit side of component by holding the components in a polishing jig and polish using water based solution containing grit of size not more than 0.1 $\mu$m.

15. Deposit non-wetting (low surface energy) material over the nozzle tip and surrounding region using jigged roller transfer method. Galydene has a low surface energy of <18 dynes cm². Fluorinated diamond-like carbon can be deposited in a PECVD reactor as an alternative to the Galydene.

16. Bond into printhead package using Epo-Tek H31 electrically conductive one component epoxy and roller transfer the adhesive. Apply pressure to ensure very thin bond line cure at 120° C. for 2 hours.

17. Tab bond external connections to actuator contacts to excimer laser defined contact fingers and customised thin film contact metallisation.

18. Actuator protective cover is an extruded plastic cover and is bonded or clipped over the whole printhead assembly to prevent accidental damage to the actuators and their external contact bonds.

B. Extrusion

This fabrication method will make use of a polycarbonate or similar extruded section material so designed as to provide the support columns and the flexing membranes from one mould. It is possible that aluminium might be a possible candidate material.

Both plastic injection moulding and the LIGA forming processes are being considered for the manufacture of the section.

C. PCB Micro Lithographic—Polvimide Sculptured Body with Integral Nozzles

A device is fabricated as follows:

1. Thick (100 μm to 500 μm) polyimide sheet metallised on one side. UBE "S" polyimide sheet is the preferred material but any polyimide (e.g., Du Pont Kapton) would be acceptable.
2. Photolithographic patterning of polyimide metal.
3. Wet or dry etching of the polyimide metal.
4. PZT stack bonded to the patterned metal on polyimide.
5. Excimer laser etching of 3-D pattern into non-metallised side of polyimide sheet. Pattern to include one or more of the following: Reservoir chamber—secondary actuator location; Pressure generation chamber—primary actuator location; Fluid transport ducting—variable cross section to control fluid flow including reverse tapered cross-section to avoid clogging; Recessed nozzle exit—formation of minimal annulus area to assist drop detachment; Elongated recess beyond nozzle—location of electrostatic field electrodes.
6. Excimer laser etching of ejection nozzles. Pattering to include: Single 0° angle ejection. Multiple nozzles employing etching angles to direct drops to a single side on surface. Multiple nozzles employing etching angles to direct drops to a single side in-flight. Assumes nozzles not formed during the patterning of the component as defined in 5. above.
7. Support plate sealed to the machined structure with suitable adhesive. Complementary patterned polyimide sheet is the preferred material but other including metals, glass, plastics, ceramics, and laminates are acceptable. This support plate does not need to be patterned for the device to work.
8. Provision on non-wetting surface to the nozzle region.
9. Bond into printhead package/assembly.
10. TAB bond external connections to base patterned metal and top contact of the PZT stack.
11. Printhead assembly protective cover.

An alternative process would be to use the LIGA process to form a plastic (urethane based) mould with the features as defined in 5. and 6. above built-in.

D. Lithographie, Galvanoformung, Abformung (LIGA) or Lithography, Electroplatina, and Micromoulding A device may be fabricated as follows:

1. Irradiate mould polymer (e.e. polymethyl methacrylate [PMMA] or polyurethane, polyester, acrylic) using a suitable patterning mask (gold mounted on diamond film) and synchrotron (high intensity parallel X-rays-wavelength 0.2 nm to 0.5 nm) radiation.
2. Develop pattern.
3. Magnetron sputter deposit titanium as the seed metal and oxidize, which permits the electrodeposition of the metallic mould material.
4. Electrodeposit metal (e.g., nickel, copper). Formation of a metallic mould.
5. Produce require copy of structure from the master mould.

This fabrication method might be a candidate for the manufacture of micro-moulded filters with pores of precise, predefined size and constructed so that they taper away from the input side to avoid clogging.

Piezoelectric bimorph driven 3-D shaped cantilevers could be employed in the structure design to effect dynamically controlled sealing of fluid transport ducting adjacent to the pressure generation pulse.

It will be understood that the present invention has been described above purely by way of example, and modifications of detail can be made within the scope of the invention.

Each feature disclosed in the description, and (where appropriate) the claims and drawings may be provided independently or in any appropriate combination.

What is claimed is:

1. A method of forming a tactile feature on a surface using the technique of drop ejection to deposit droplets of deposition material, said method comprising depositing a plurality of droplets on said surfacc to form a tactile feature comprising multiple discrete portions, at least two adjacent portions being formed from different deposition materials.

2. A method according to claim 1, wherein said tactile feature comprises a tactile character.

3. A method according to claim 2, wherein said tactile character comprises a Braille character.

4. A method according to claim 1, wherein said tactile feature comprises a feature for a tactile map.

5. A method according to claim 1, wherein said tactile feature comprises at least one portion establishing a bulk profile of said tactile feature and at least one portion establishing texture of said tactile feature.

6. A method according to claim 1, further comprising the step of subjecting the droplets of deposition material to radiation treatment before deposition.

7. A method according to claim 1, further comprising the step of subjecting the droplets of deposition material to radiation treatment during deposition.

8. A method according to claim 1, wherein the droplets of deposition material are subjected to pulses of electromagnetic radiation coincident thereon.

9. A method according to claim 8, wherein said droplets of deposition material are deposited from a nozzle in fluid communication with a deposition chamber of a deposition printhead, and the pulses of electromagnetic radiation are output from a source of electromagnetic radiation integral with the deposition printhead.

10. A method according to claim 9, wherein the pulses of electromagnetic radiation are focused on the droplets of deposition material.

11. A method according to claim 1, further comprising the step of subjecting the droplets of deposition material to radiation treatment after deposition.

12. A method according to claim 11, wherein the droplets of deposition material are subjected to pulses of electromagnetic radiation coincident thereon.

13. A method according to claim 12, wherein said droplets of deposition material are deposited from a nozzle in fluid communication with a deposition chamber of a deposition printhead, and the pulses of electromagnetic radiation are output from a source of electromagnetic radiation integral with the deposition printhead.

14. A method according to claim 12, wherein the pulses of electromagnetic radiation are focused on the droplets of deposition material.

15. A method according to claim 1, further comprising utilising a droplet of cross-linkable polymeric material and initiating the cross-linking immediately after deposition by chemical means using a further droplet coincident thereon.

16. A method according to claim 1, wherein the plurality of droplets comprise at least one droplet of one material and at least one droplet of another material.

17. A method according to claim 16, wherein the different deposition materials are deposited from respective nozzles of a deposition printhead, each nozzle being in fluid communication with respective deposition chambers of said printhead.

18. A method according to claim 17, wherein the nozzles are directed towards a single droplet deposition site.

19. A method according to claim 1, further comprising utilising a droplet of cross-linkable polymeric material and initiating the cross-linking immediately after deposition by chemical means using radiation treatment.

20. A method according to claim 1, further comprising utilising a droplet of cross-linkable polymeric material and initiating the cross-linking in-flight chemical means using radiation treatment.

21. A method of forming a tactile feature on a surface using the technique of drop ejection to deposit droplets of deposition material, said method comprising depositing a plurality of droplets on said surface to form a tactile feature comprising multiple discrete portions, wherein said tactile feature comprises at least one portion establishing a bulk profile of said tactile feature and at least one portion formed on the bulk profile establishing texture of said tactile feature.

22. A method according to claim 21, wherein said tactile feature comprises a tactile character.

23. A method according to claim 22, wherein said tactile character comprises a Braille character.

24. A method according to claim 21, wherein said tactile feature comprises a feature for a tactile map.

25. A method according to claim 21, further comprising the step of subjecting the droplets of deposition material to radiation treatment before deposition.

26. A method according to claim 21, further comprising the step subjecting the droplets of deposition material to radiation treatment during deposition.

27. A method according to claim 21, wherein the droplets of deposition material are subjected t o pulses of electromagnetic radiation coincident thereon.

28. A method according to claim 27, wherein said droplets of deposition material are deposited from a nozzle in fluid communication with a deposition chamber of a deposition printhead, and the pulses of electromagnetic radiation are output from a source of electromagnetic radiation integral with the deposition printhead.

29. A method according to claim 28, wherein the pulses of electromagnetic radiation are focused on the droplets of deposition material.

30. A method according to claim 21, further comprising the step of subjecting the droplets of deposition material to radiation treatment after deposition.

31. A method according to claim 30, wherein the droplets of deposition material are subjected to pulses of electromagnetic radiation coincident thereon.

32. A method according to claim 31, wherein said droplets of deposition material are deposited fiom a nozzle in fluid communication with a deposition chamber of a deposition printhead, and the pulses of electromagnetic radiation are output from a source of electromagnetic radiation integral with the deposition printhead.

33. A method according to claim 29, wherein the pulses of electromagnetic radiation are focused on the droplets of deposition material.

34. A method according to claim 21, further comprising utilising a droplet of cross-linkable polymeric material and initiating the cross-linking immediately after deposition by chemical means using a droplet coincident thereon.

35. A method according to claim 21, wherein the plurality of droplets comprise at least one droplet of one material and at least one droplet of another material.

36. A method according to claim 35, wherein the different deposition materials are deposited from respective nozzles of a deposition printhead, each nozzle being in fluid communication with respective deposition chambers of said printhead.

37. A method according to claim 36, wherein the nozzles are directed towards a single droplet deposition site.

38. A method according to claim 21, further comprising utilising a droplet of cross-linkable polymeric material and initiating the cross-linking immediately after deposition by chemical means using radiation treatment.

39. A method according to claim 21, further comprising utilising a droplet of cross-linkable polymeric material and initiating the cross-linking in-flight by chemical means using radiation treatment.

40. A method of forming a tactile feature on a surface using the technique of drop ejection to deposit droplets of deposition material, said method comprising depositing a plurality of droplets on said surface to form a tactile feature comprising multiple discrete portions, and subjecting said droplets of deposition material to radiation treatment before deposition.

41. A method of forming a tactile feature on a surface using the technique of drop ejection to deposit droplets of deposition material, said method comprising depositing a plurality of droplets on said surface to form a tactile feature comprising multiple discrete portions, and subjecting said droplets of deposition material to radiation treatment during deposition.

42. A method of forming a tactile feature on a surface using the technique of drop ejection to deposit droplets of deposition material, said method comprising depositing a plurality of droplets on said surface to form a tactile feature comprising multiple discrete portions, and subjecting the droplets of deposition material to pulses of electromagnetic radiation coincident thereon.

43. A method according to claim 42, wherein said droplets of deposition material are deposited from a nozzle in fluid communication with a deposition chamber of a deposition printhead, and the pulses of electromagnetic radiation are output from a source of electromagnetic radiation integral with the deposition printhead.

44. A method according to claim 43, wherein the pulses of electromagnetic radiation are focused on the droplets of deposition material.

45. A method of forming a tactile feature on a surface using the technique of drop ejection to deposit droplets of deposition material, said method comprising depositing a plurality of droplets on said surface to form a tactile feature comprising multiple discrete portions, and subjecting the droplets of deposition material to pulses of electromagnetic radiation coincident thereon after deposition.

46. A method according to claim 45, wherein said droplets of deposition material are deposited from a nozzle in fluid communication with a deposition chamber of a deposition printhead, and the pulses of electromagnetic radiation are output from a source of electromagnetic radiation integral with the deposition printhead.

47. A method according to claim 45, wherein the pulses of electromagnetic radiation are focused on the droplets of deposition material.

48. A method of forming a tactile feature on a surface using the technique of drop ejection to deposit droplets of deposition material, said method comprising depositing a plurality of droplets on said surface to form a tactile feature comprising multiple discrete portions, and utilising a droplet of cross-linkable polymeric material and initiating the cross-linking immediately after deposition by chemical means using a further droplet coincident thereon.

49. A method of forming a tactile feature on a surface using the technique of drop ejection to deposit droplets of deposition material, said method comprising depositing a plurality of droplets on said surface to form a tactile feature comprising multiple discrete portions, and utilising a droplet of cross-linkable polymeric material and initiating the cross-linking immediately after deposition by chemical means using radiation treatment.

* * * * *